United States Patent
Smith et al.

(10) Patent No.: US 10,345,531 B2
(45) Date of Patent: *Jul. 9, 2019

(54) FIBER OPTIC/ELECTRICAL CONNECTION SYSTEM

(71) Applicant: CommScope Technologies LLC, Hickory, NC (US)

(72) Inventors: Trevor D. Smith, Eden Prairie, MN (US); Yu Lu, Eden Prairie, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/996,962

(22) Filed: Jun. 4, 2018

(65) Prior Publication Data

US 2018/0284355 A1 Oct. 4, 2018

Related U.S. Application Data

(63) Continuation of application No. 15/282,165, filed on Sep. 30, 2016, now Pat. No. 9,989,707, which is a (Continued)

(51) Int. Cl.
*G02B 6/36* (2006.01)
*G02B 6/38* (2006.01)
(Continued)

(52) U.S. Cl.
CPC ......... *G02B 6/3817* (2013.01); *G02B 6/3825* (2013.01); *G02B 6/3874* (2013.01);
(Continued)

(58) Field of Classification Search
CPC ...... G02B 6/3887; G02B 6/36; G02B 6/3897; G02B 6/3889
See application file for complete search history.

(56) References Cited

U.S. PATENT DOCUMENTS 4,373,777 A   2/1983  Borsuk et al.
4,449,784 A   5/1984  Basov et al.
(Continued)

FOREIGN PATENT DOCUMENTS

EP   1199587 A1   4/2002
GB   2289140 A    11/1995
(Continued)

OTHER PUBLICATIONS

International Search Report and Written Opinion dated Oct. 27, 2011 re PCT/US2011/023736.
(Continued)

*Primary Examiner* — Jennifer Doan
(74) *Attorney, Agent, or Firm* — Merchant & Gould P.C.

(57) ABSTRACT

A fiber optic and electrical connection system includes a fiber optic cable, a ruggedized fiber optic connector, a ruggedized fiber optic adapter, and a fiber optic enclosure. The cable includes one or more electrically conducting strength members. The connector, the adapter, and the enclosure each have one or more electrical conductors. The cable is terminated by the connector with the conductors of the connector in electrical communication with the strength members. The conductors of the connector electrically contact the conductors of the adapter when the connector and the adapter are mechanically connected. And, the conductors of the adapter electrically contact the conductors of the enclosure when the adapter is mounted on the enclosure.

20 Claims, 15 Drawing Sheets

Related U.S. Application Data continuation of application No. 14/822,170, filed on Aug. 10, 2015, now Pat. No. 9,459,411, which is a continuation of application No. 14/552,210, filed on Nov. 24, 2014, now Pat. No. 9,104,001, which is a continuation of application No. 13/936,499, filed on Jul. 8, 2013, now Pat. No. 8,894,300, which is a continuation of application No. 13/021,416, filed on Feb. 4, 2011, now Pat. No. 8,480,312.

(60) Provisional application No. 61/301,460, filed on Feb. 4, 2010.

(51) Int. Cl.
  *G02B 6/42* (2006.01)
  *G02B 6/44* (2006.01)

(52) U.S. Cl.
  CPC ......... *G02B 6/3887* (2013.01); *G02B 6/3894* (2013.01); *G02B 6/3897* (2013.01); *G02B 6/4293* (2013.01); *G02B 6/4434* (2013.01)

(56) References Cited

U.S. PATENT DOCUMENTS

| | | | |
|---|---|---|---|
| 4,896,939 | A | 1/1990 | O'Brien |
| 5,159,651 | A | 10/1992 | Gandy |
| 5,234,353 | A | 8/1993 | Scholz et al. |
| 5,267,337 | A | 11/1993 | Kirma |
| 5,345,520 | A | 9/1994 | Grile |
| 5,419,717 | A | 5/1995 | Abendschein et al. |
| 5,461,688 | A | 10/1995 | Lee |
| 5,467,420 | A | 11/1995 | Rohrmann et al. |
| 5,473,715 | A | 12/1995 | Schofield et al. |
| 5,574,815 | A | 11/1996 | Kneeland |
| 6,416,334 | B1 | 7/2002 | Plishner |
| 6,542,674 | B1 | 4/2003 | Gimblet |
| 6,546,175 | B1 | 4/2003 | Wagman et al. |
| 6,579,014 | B2 | 6/2003 | Melton et al. |
| 6,588,938 | B1 | 7/2003 | Lampert et al. |
| 6,648,520 | B2 | 11/2003 | McDonald et al. |
| 6,708,640 | B1 | 3/2004 | Williams |
| 6,733,186 | B2 | 5/2004 | Pfleger |
| 6,899,467 | B2 | 5/2005 | McDonald et al. |
| 6,931,183 | B2 | 8/2005 | Panak et al. |
| 7,018,331 | B2 | 3/2006 | Chang et al. |
| 7,090,406 | B2 | 8/2006 | Melton et al. |
| 7,090,407 | B2 | 8/2006 | Melton et al. |
| 7,111,990 | B2 | 9/2006 | Melton et al. |
| 7,113,679 | B2 | 9/2006 | Melton et al. |
| 7,137,742 | B2 | 11/2006 | Theuerkorn et al. |
| 7,213,975 | B2 | 5/2007 | Khemakhem et al. |
| 7,264,402 | B2 | 9/2007 | Theuerkorn et al. |
| 7,463,803 | B2 | 12/2008 | Cody |
| 7,481,585 | B2 | 1/2009 | Scadden et al. |
| 7,572,065 | B2 | 8/2009 | Lu et al. |
| 7,627,222 | B2 | 12/2009 | Reagan et al. |
| 7,677,813 | B2 | 3/2010 | Anrig et al. |
| 7,744,286 | B2 | 6/2010 | Lu et al. |
| 7,744,288 | B2 | 6/2010 | Lu et al. |
| 7,762,726 | B2 | 7/2010 | Lu et al. |
| 7,785,019 | B2 | 8/2010 | Lewallen et al. |
| 7,798,725 | B2 | 9/2010 | Khemakhem et al. |
| 7,848,604 | B2 | 12/2010 | Reed et al. |
| 7,942,590 | B2 | 5/2011 | Lu et al. |
| 8,038,356 | B2 | 10/2011 | Marcouiller et al. |
| 8,083,416 | B2 | 12/2011 | Scadden et al. |
| 8,113,720 | B2 | 2/2012 | Scadden et al. |
| 8,147,147 | B2 | 4/2012 | Khemakhem et al. |
| 8,202,008 | B2 | 6/2012 | Lu et al. |
| RE43,542 | E | 7/2012 | Murray et al. |
| 8,272,790 | B2 | 9/2012 | Belsan et al. |
| 8,480,312 | B2 | 7/2013 | Smith et al. |
| 8,842,962 | B2 | 9/2014 | Beamon et al. |
| 8,882,363 | B2 | 11/2014 | Dong et al. |
| 8,894,300 | B2 | 11/2014 | Smith et al. |
| 9,104,001 | B2 | 8/2015 | Smith et al. |
| 9,459,411 | B2 | 10/2016 | Smith et al. |
| 9,989,707 | B2 * | 6/2018 | Smith ................ G02B 6/3817 |
| 2004/0050314 | A1 | 3/2004 | Williams |
| 2005/0053342 | A1 | 3/2005 | Melton et al. |
| 2007/0105452 | A1 | 5/2007 | Gerlach et al. |
| 2007/0160327 | A1 | 7/2007 | Lewallen et al. |
| 2008/0080817 | A1 | 4/2008 | Melton et al. |
| 2008/0138025 | A1 | 6/2008 | Reagan et al. |
| 2008/0175541 | A1 | 7/2008 | Lu et al. |
| 2009/0148101 | A1 | 6/2009 | Lu et al. |
| 2009/0148103 | A1 | 6/2009 | Lu et al. |
| 2009/0148104 | A1 | 6/2009 | Lu et al. |
| 2009/0269011 | A1 | 10/2009 | Scadden et al. |
| 2009/0304335 | A1 | 12/2009 | Marcouiller et al. |
| 2011/0123157 | A1 | 5/2011 | Belsan et al. |
| 2011/0200286 | A1 | 8/2011 | Smith et al. |
| 2011/0243567 | A1 | 10/2011 | Su et al. |
| 2011/0311187 | A1 | 12/2011 | Wang et al. |
| 2012/0039571 | A1 | 2/2012 | Ciechomski et al. |
| 2012/0302104 | A1 | 11/2012 | WU |
| 2013/0322826 | A1 | 12/2013 | Henke et al. |

FOREIGN PATENT DOCUMENTS

| | | |
|---|---|---|
| WO | 2013189370 A2 | 12/2013 |
| WO | 2014126975 A1 | 8/2014 |

OTHER PUBLICATIONS

European Search Report for Application No. 11740419 search completed Jan. 23, 2018.

* cited by examiner

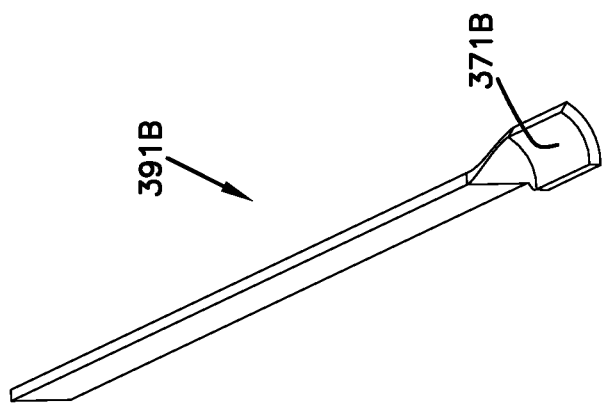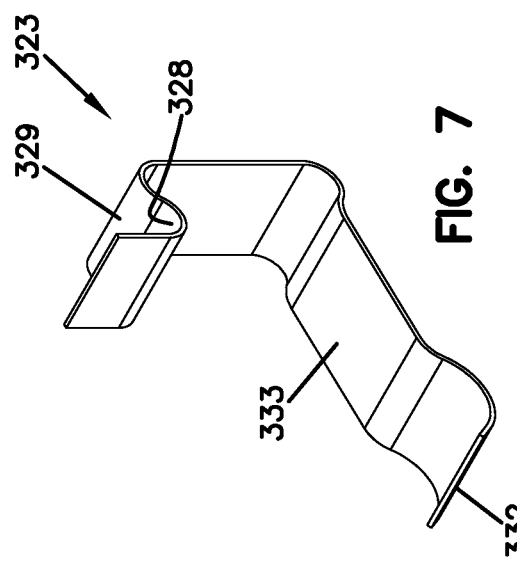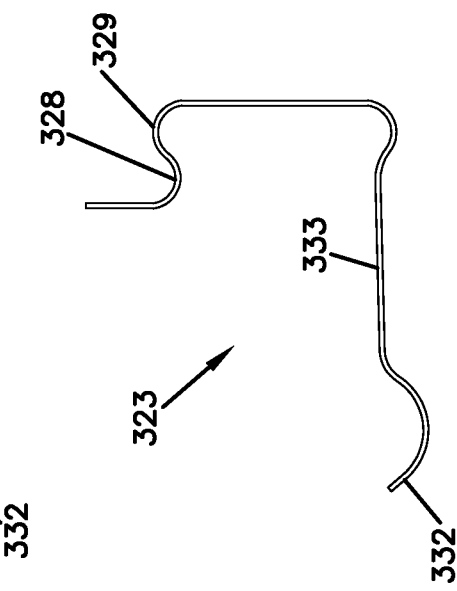

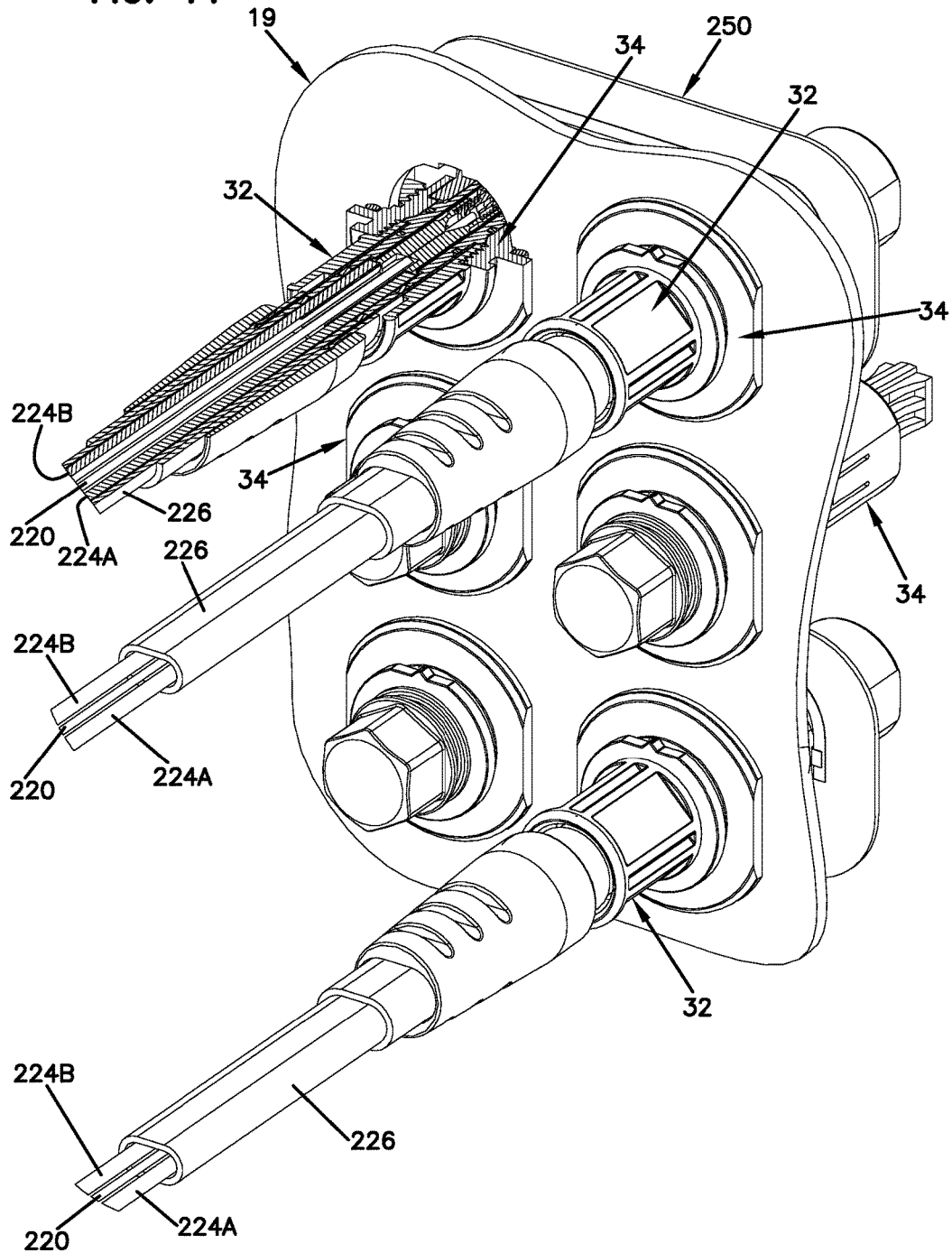

FIBER OPTIC/ELECTRICAL CONNECTION SYSTEM

CROSS REFERENCE TO RELATED APPLICATIONS

The present application is a continuation of U.S. patent application Ser. No. 15/282,165, filed Sep. 30, 2016 which is a continuation of U.S. patent application Ser. No. 14/822, 170, filed Aug. 10, 2015, now U.S. Pat. No. 9,459,411, issued Oct. 4, 2016, which is a continuation of U.S. patent application Ser. No. 14/552,210, filed Nov. 24, 2014, now U.S. Pat. No. 9,104,001, issued Aug. 11, 2015, which is a continuation of U.S. patent application Ser. No. 13/936,499, filed Jul. 8, 2013, now U.S. Pat. No. 8,894,300, issued Nov. 25, 2014, which is a continuation of U.S. patent application Ser. No. 13/021,416, filed Feb. 4, 2011, now U.S. Pat. No. 8,480,312, issued Jul. 9, 2013, which claims the benefit of Provisional Patent Application Ser. No. 61/301,460, filed Feb. 4, 2010, which applications are hereby incorporated by reference in their entireties. The present application is related to U.S. Provisional Patent Application Ser. No. 61/007,222, filed Dec. 11, 2007; U.S. Provisional Patent Application Ser. No. 61/029,524, filed Feb. 18, 2008; and to the following U.S. Patent Application Publications, all filed on Sep. 3, 2008 and published Jun. 11, 2009: Pub. No. 2009/0148101, entitled "Hardened Fiber Optic Connection System with Multiple Configurations", now U.S. Pat. No. 7,744,286, issued Jun. 29, 2010; Pub. No. 2009/0148102, entitled "Hardened Fiber Optic Connector Compatible with Hardened and Non-Hardened Fiber Optic Adapters", now U.S. Pat. No. 7,744,288, issued Jun. 29, 2010; Pub. No. 2009/0148103, entitled "Hardened Fiber Optic Connector and Cable Assembly with Multiple Configurations", now U.S. Pat. No. 7,942,590, issued May 17, 2011; and Pub. No. 2009/0148104, entitled "Hardened Fiber Optic Connection System", now U.S. Pat. No. 7,762,726, issued Jul. 27, 2010, which applications and publications are hereby incorporated by reference in their entireties.

TECHNICAL FIELD

The present disclosure relates to fiber optic and electrical connection systems, and more particularly to connection systems that simultaneously connect both optical and electrical circuits.

BACKGROUND

Fiber optic cables are widely used to transmit light signals for high speed data transmission. A fiber optic cable typically includes: (1) an optical fiber or optical fibers; (2) a buffer or buffers that surrounds the fiber or fibers; (3) a strength layer and/or strength members that surrounds the buffer or buffers; and (4) an outer jacket. Optical fibers function to carry optical signals. A typical optical fiber includes an inner core surrounded by a cladding that is covered by a coating. Buffers (e.g., loose or tight buffer tubes) typically function to surround and protect coated optical fibers. Strength layers and/or strength members add mechanical strength to fiber optic cables to protect the internal optical fibers against stresses applied to the cables during installation and thereafter. Example strength layers/strength members include aramid yarn, steel, glass-reinforced plastic (GRP), and epoxy reinforced glass roving. Outer jackets provide protection against damage caused by crushing, abrasions, and other physical damage. Outer jackets also provide protection against chemical damage (e.g., ozone, alkali, acids).

Fiber optic cable connection systems are used to facilitate connecting and disconnecting fiber optic cables in the field without requiring a splice. A typical fiber optic cable connection system for interconnecting two fiber optic cables includes fiber optic connectors mounted at the ends of the fiber optic cables, and an adapter for mechanically and optically coupling the fiber optic connectors together. Fiber optic connectors generally include ferrules that support the ends of the optical fibers of the fiber optic cables. The end faces of the ferrules are typically polished and are often angled. The adapter includes co-axially aligned ports (i.e., receptacles) for receiving the fiber optic connectors desired to be interconnected. The adapter includes an internal sleeve that receives and aligns the ferrules of the fiber optic connectors when the connectors are inserted within the ports of the adapter. With the ferrules and their associated fibers aligned within the sleeve of the adapter, a fiber optic signal can pass from one fiber to the next. The adapter also typically has a mechanical fastening arrangement (e.g., a snap-fit arrangement) for mechanically retaining the fiber optic connectors within the adapter. One example of an existing fiber optic connection system is described in U.S. Pat. Nos. 6,579,014, 6,648,520, and 6,899,467.

SUMMARY

One aspect of the present disclosure relates to a fiber optic and electrical connection system that includes a fiber optic cable, a ruggedized fiber optic connector, and a ruggedized fiber optic adapter.

The fiber optic cable includes first and second strength members that are electrically conductive, an optical fiber, and a cable jacket that is positioned around the first and the second strength members and the optical fiber. The ruggedized fiber optic connector terminates an end of the fiber optic cable and includes a connector housing with a first end for receiving the first and the second strength members and a second opposite end with a plug portion. A ferrule is mounted to the plug portion and terminates the optical fiber of the fiber optic cable. The ruggedized fiber optic connector includes a first electrical conductor and a second electrical conductor. The first electrical conductor is electrically connected with the first strength member, and the second electrical conductor is electrically connected with the second strength member. A coupling nut is rotatably mounted around the connector housing, and a sealing member is mounted around the connector housing between the coupling nut and the second end of the connector housing. The ruggedized fiber optic adapter includes an adapter housing with a first end that defines a ruggedized port and an opposite second end that defines a non-ruggedized port. A ferrule sleeve within the adapter housing is adapted to receive the ferrule of the ruggedized fiber optic connector and is accessible from both the ruggedized and the non-ruggedized ports. The ruggedized fiber optic adapter includes a third electrical conductor and a fourth electrical conductor. The third electrical conductor includes a first contact that is accessible from the ruggedized port and a second contact that is positioned outside the adapter housing. The fourth electrical conductor includes a third contact that is accessible from the ruggedized port and a fourth contact that is positioned outside the adapter housing.

The ruggedized port of the ruggedized fiber optic adapter is configured to receive the plug portion of the ruggedized fiber optic connector. The ruggedized port includes internal threads that threadingly receive external threads of the coupling nut, and the ruggedized port includes a sealing surface that engages the sealing member of the ruggedized fiber optic connector when the ruggedized fiber optic connector is fully connected to the ruggedized fiber optic adapter. The first contact of the third electrical conductor of the ruggedized fiber optic adapter electrically contacts the first electrical conductor of the ruggedized fiber optic connector and the second contact of the fourth electrical conductor of the ruggedized fiber optic adapter electrically contacts the second electrical conductor of the ruggedized fiber optic connector when the ruggedized fiber optic connector is fully connected to the ruggedized fiber optic adapter.

The first and the second strength members of the fiber optic cable can be electrically insulated from each other. The first and the second electrical conductors of the ruggedized fiber optic connector can be electrically insulated from each other. And, the third and the fourth electrical conductors of the ruggedized fiber optic adapter can be electrically insulated from each other.

The first and the second strength members can include a glass reinforced plastic clad by a conductive material. The connector housing of the ruggedized fiber optic connector can include a first channel for receiving the first strength member and a second channel for receiving the second strength member of the fiber optic cable. The first electrical conductor can include a first lug at least partially between the first strength member and a wall of the first channel, and the second electrical conductor can include a second lug at least partially between the second strength member and a wall of the second channel. The first lug electrically connects the first electrical conductor to the first strength member, and the second lug electrically connects the second electrical conductor to the second strength member. The first lug can be bonded to the first strength member, and the second lug can be bonded to the second strength member by an electrically conducting material.

The plug portion of the connector housing of the ruggedized fiber optic connector can include a first detent positioned opposite from a second detent. The first detent can expose a contacting portion of the first electrical conductor, and the second detent can expose a contacting portion of the second electrical conductor. The ferrule sleeve of the ruggedized fiber optic adapter can define a central longitudinal axis. The first contact of the third electrical conductor can be spring-loaded toward the longitudinal axis, and the second contact of the fourth electrical conductor can be spring-loaded toward the longitudinal axis. The first and the second contacts can initially spread apart from each other upon insertion of the plug portion of the connector housing into the ruggedized port of the ruggedized fiber optic adapter. The first contact can press into the first detent and the second contact can press into the second detent when the ruggedized fiber optic connector is fully connected to the ruggedized fiber optic adapter. The first contact can electrically contact the contacting portion of the first electrical conductor and the second contact can electrically contact the contacting portion of the second electrical conductor when the ruggedized fiber optic connector is fully connected to the ruggedized fiber optic adapter.

The adapter housing of the ruggedized fiber optic adapter can include first and second slots between the first and the second ends of the adapter housing. The first and the second slots can extend through a wall of the adapter housing from the ruggedized port to an exterior of the adapter housing.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

FIG. 7 is a perspective view of the electrical conductor of the optical/electrical adapter of FIG. 1;

FIG. 8 is a side elevation view of the electrical conductor of the optical/electrical adapter of FIG. 1;

FIG. 9 is a perspective view of the electrical conductor of the optical/electrical connector of FIG. 1;

FIG. 10 is a rear elevation view of the electrical conductor of the optical/electrical connector of FIG. 1;

FIG. 11 is a partial perspective view of a cabinet with six of the optical/electrical adapters of FIG. 1 mounted in openings of a cabinet panel of the cabinet and three of the optical/electrical connectors of FIG. 1 connected to three of the adapters and one of the adapter-connector pairs shown in horizontal cross-section;

DETAILED DESCRIPTION

The present disclosure involves fiber optic cable connection systems and components that connect both optical paths and electrical paths. In particular, a fiber optic cable includes at least one optical fiber and at least one electrical conductor. The fiber optic cable is terminated and connected to hardware such as telecommunications and/or computer hardware. Upon connection, the optical fiber is optically connected and the electrical conductor is electrically connected to the hardware via the termination. The hardware can include an adapter, and the adapter can connect the fiber optic cable to a second optical cable and/or a second electrical conductor.

Figure 1:
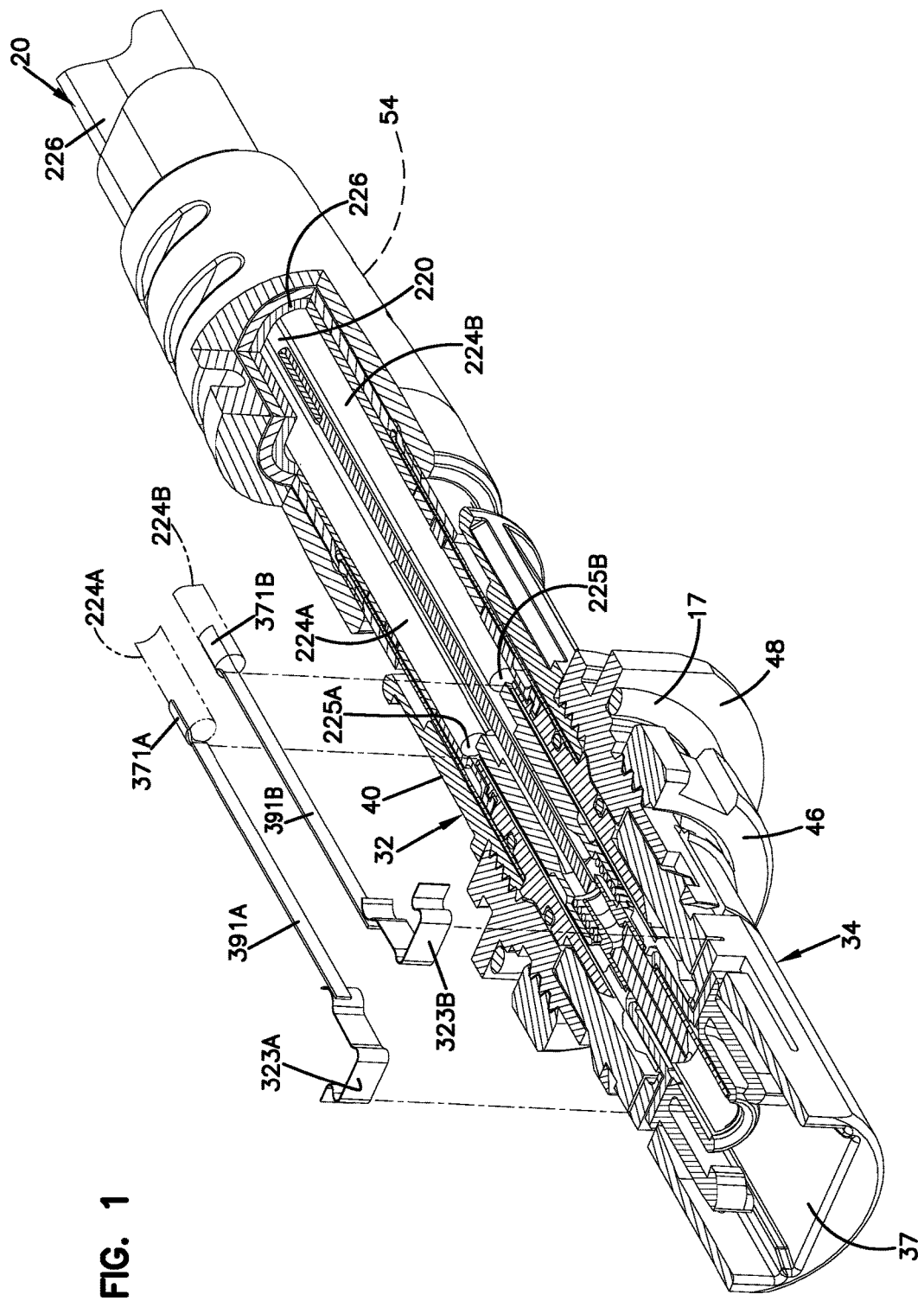
FIG. 1 is a cut-away perspective view of an optical/electrical cable terminated by an optical/electrical connector with the optical/electrical connector connected to an optical/electrical adapter and electrical conductors of the optical/electrical connector and the optical/electrical adapter vertically exploded above the connector and the adapter.
Figure 2:
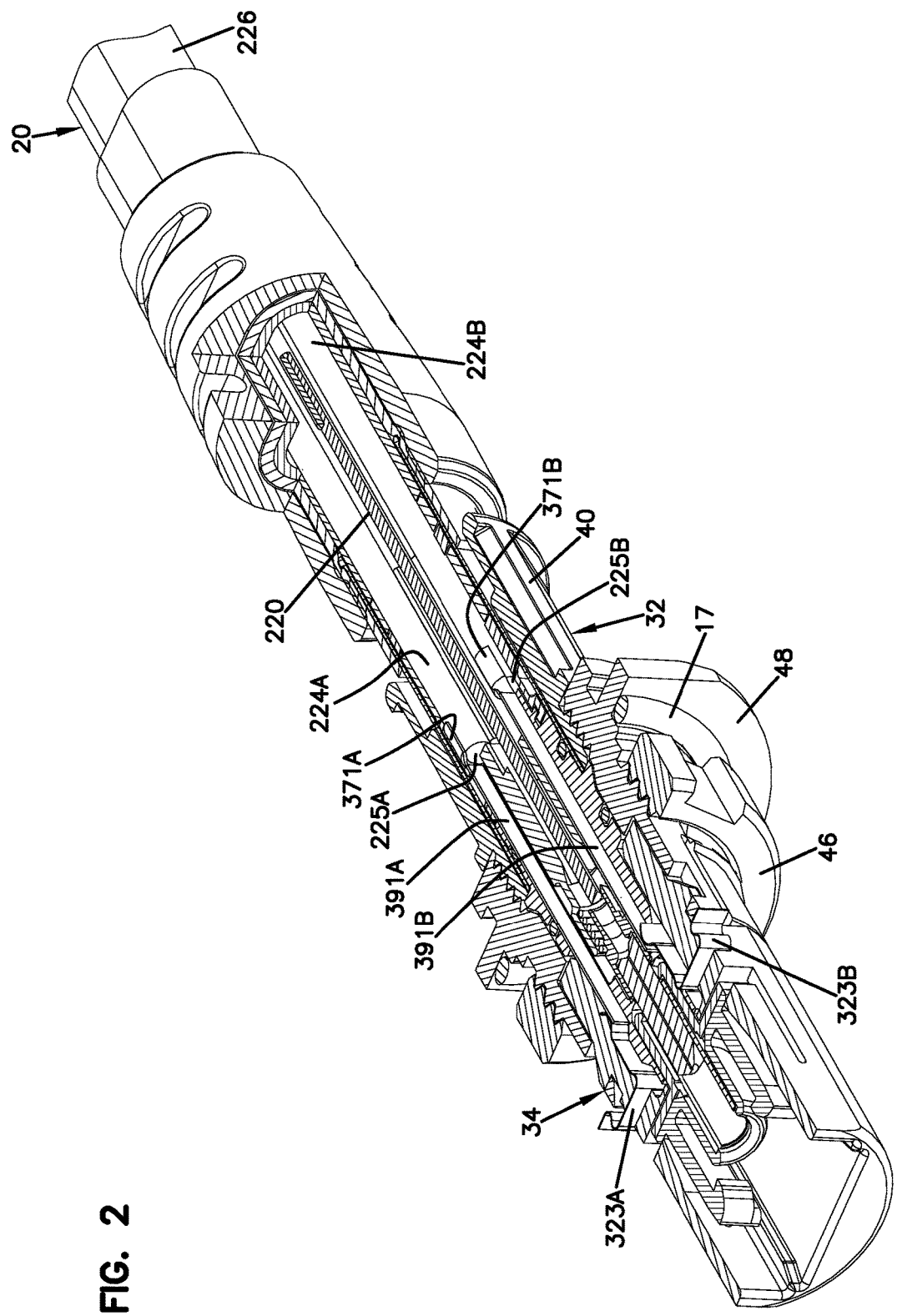
FIG. 2 is the cut-away perspective view of FIG. 1 but with the uncut electrical conductors of FIG. 1 unexploded.

As depicted, a fiber optic cable 20 includes two electrical conductors, 224A and 224B. In particular, the fiber optic cable 20 includes a first strength member 224A and a second strength member 224B that are electrically conductive and function as the electrical conductors 224A, 224B (see FIGS. 1 and 2). Example strength members 224A, 224B can be made of aramid yarn, steel, glass-reinforced plastic (GRP), and/or epoxy reinforced glass roving. The strength members 224A, 224B can include a conductive metallic coating such as an aluminum or a copper coating over otherwise non-conducting or poorly conducting material. The strength members 224A, 224B can include conductive metallic strands such as aluminum or copper strands, and the strands can be mixed with otherwise non-conducting or poorly conducting material of the strength members 224A, 224B. In other embodiments, the electrical conductors 224A and 224B can be separate from the strength members. The example fiber optic cable 20 further includes an optical fiber 500, a buffer layer 220 (see FIGS. 5 and 6), and a cable jacket 226.

As depicted, the fiber optic cable 20 is terminated by a fiber optic connector 32. The fiber optic connector 32 can be a ruggedized fiber optic connector and is depicted as such. The fiber optic connector 32 includes similarities to fiber optic connectors illustrated at U.S. Patent Application Publications 2009/0148101, 2009/0148102, 2009/0148103, and 2009/0148104, incorporated by reference above. The fiber optic connector 32 includes a connector housing 39 (see FIG. 5) that extends between a proximal end 54 (see FIG. 1) and a distal end 52 (see FIG. 5). The distal end 52 includes a plug portion 56, and the proximal end 54 is mechanically connected to the fiber optic cable 20. A coupling nut 40 with external threads 75 can be placed over and/or rotatably mounted on the connector housing 39. A sealing member 49 can be placed around the connector housing 39 between the coupling nut 40 and the distal end 52. A ferrule 100 is mounted to the plug portion 56 and terminates the optical fiber 500 of the fiber optic cable 20. The ferrule 100 defines a central longitudinal axis $A_1$ of the fiber optic connector 32 (see FIGS. 5 and 6).

Figure 5:
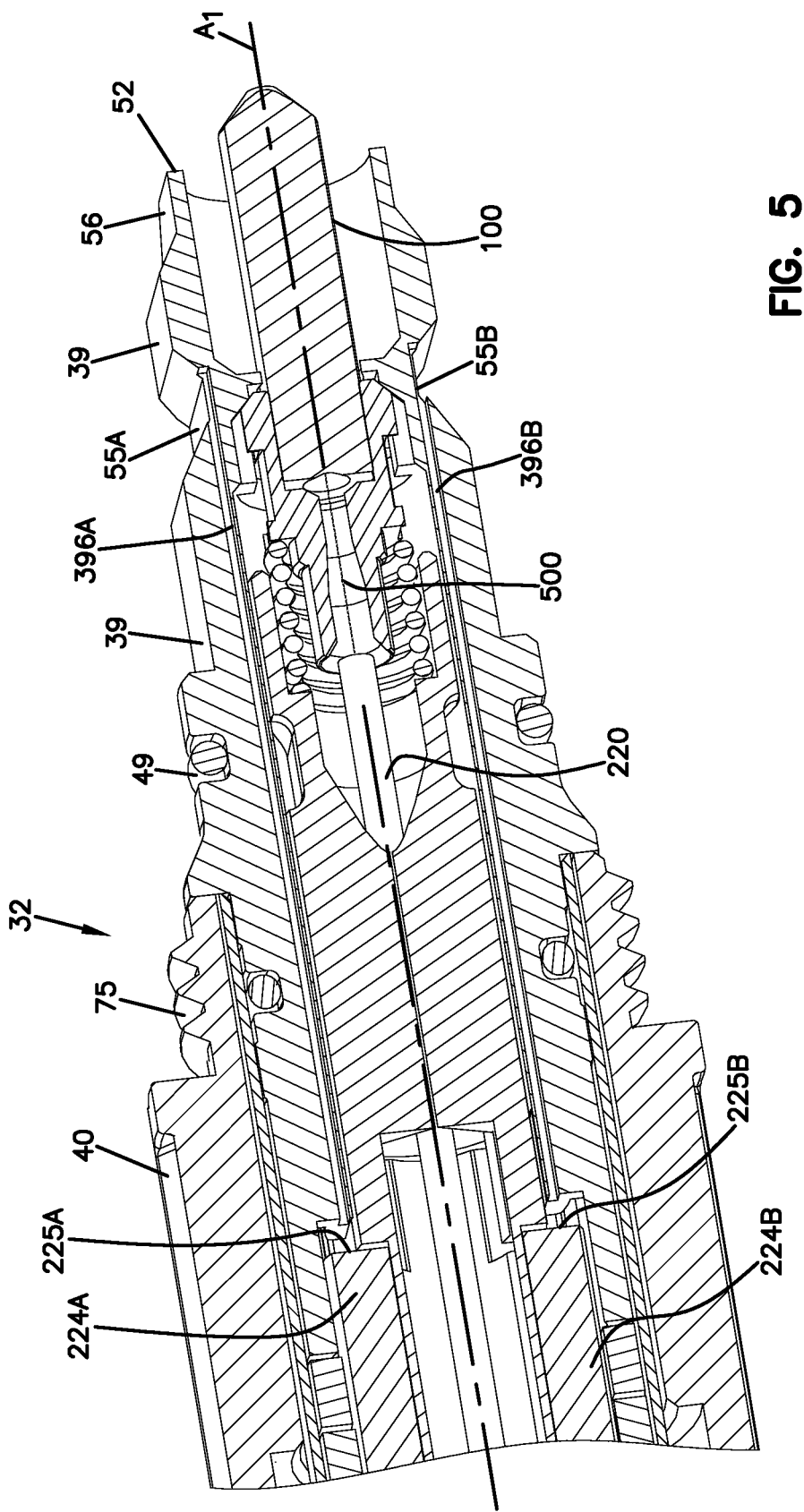
FIG. 5 is a cross-sectional perspective view of the optical/electrical connector of FIG. 1 with the electrical conductors of the optical/electrical connector removed.

The fiber optic connector 32 includes a first electrical conductor 391A and a second electrical conductor 391B. The first electrical conductor 391A is electrically connected with the first strength member 224A, and the second electrical conductor 391B is electrically connected with the second strength member 224B (see FIG. 6). As depicted, the connector housing 39 includes a first pathway 396A and a second pathway 396B that extend at least partially within the connector housing 39 (see FIG. 5). The first and the second pathways 396A, 396B extend within a circumference of the sealing member 49 and thus do not interfere or compromise functionality of the sealing member 49. The first and the second pathways 396A, 396B extend within an interior of the coupling nut 40 and thus do not interfere or compromise functionality of the coupling nut 40. Likewise, the first and the second pathways 396A, 396B extend within various other features of the connector housing 39, as illustrated at FIG. 5. As depicted, the first and the second pathways 396A, 396B distally emerge at detents 55A and 55B of the connector housing 39 respectively, and the pathways 396A, 396B proximally emerge within the connector 32 near ends 225A, 225B of the strength members 224A, 224B. The detents 55A, 55B can be positioned at the plug portion 56 of the connector housing 39. As depicted, the first electrical conductor 391A is positioned partially within the first pathway 396A, and the second electrical conductor 391B is positioned partially within the second pathway 396B.

Figure 6:
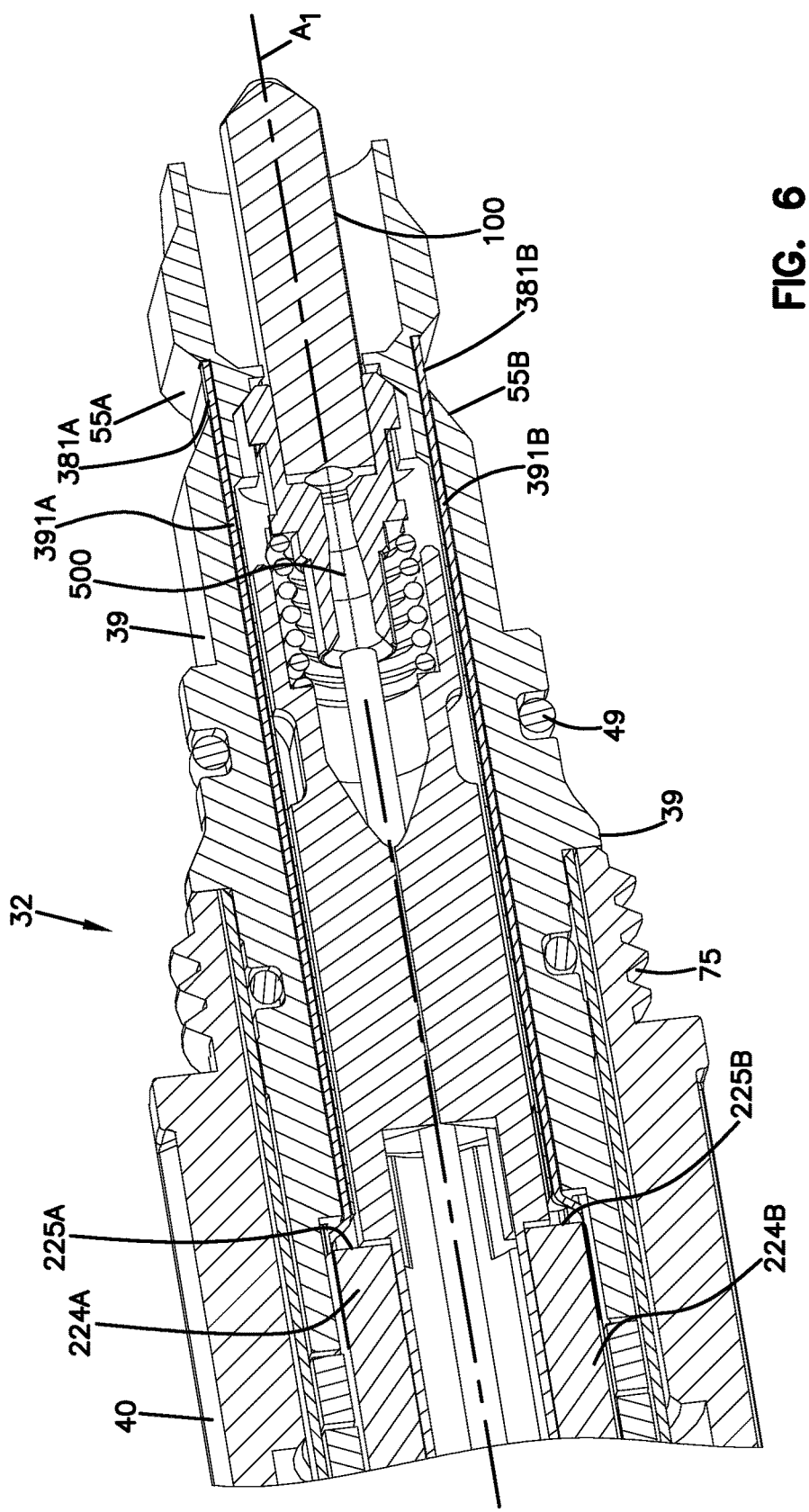
FIG. 6 is the cross-sectional perspective view of FIG. 5 but with the electrical conductors shown.

The first electrical conductor 391A of the fiber optic connector 32 includes a contacting portion 381A at or near its distal end, and the second electrical conductor 391B of the fiber optic connector 32 includes a contacting portion 381B at or near its distal end (see FIG. 6). The contacting portion 381A is exposed within the detent 55A, and the contacting portion 381B is exposed within the detent 55B. The first electrical conductor 391A of the fiber optic connector 32 includes a lug 371A at or near its proximal end, and the second electrical conductor 391B of the fiber optic connector 32 includes a lug 371B at or near its distal end (see FIGS. 1 and 2). The lugs 371A, 371B are adapted to be mechanically and electrically connected with the strength members 224A, 224B. The electrical conductors 391A, 391B thereby electrically connect the strength members 224B, 224A to the plug portion 56 of the fiber optic connector 32. As depicted, the contacting portions 381A, 381B face laterally outward from the plug portion 56.

Figure 3:
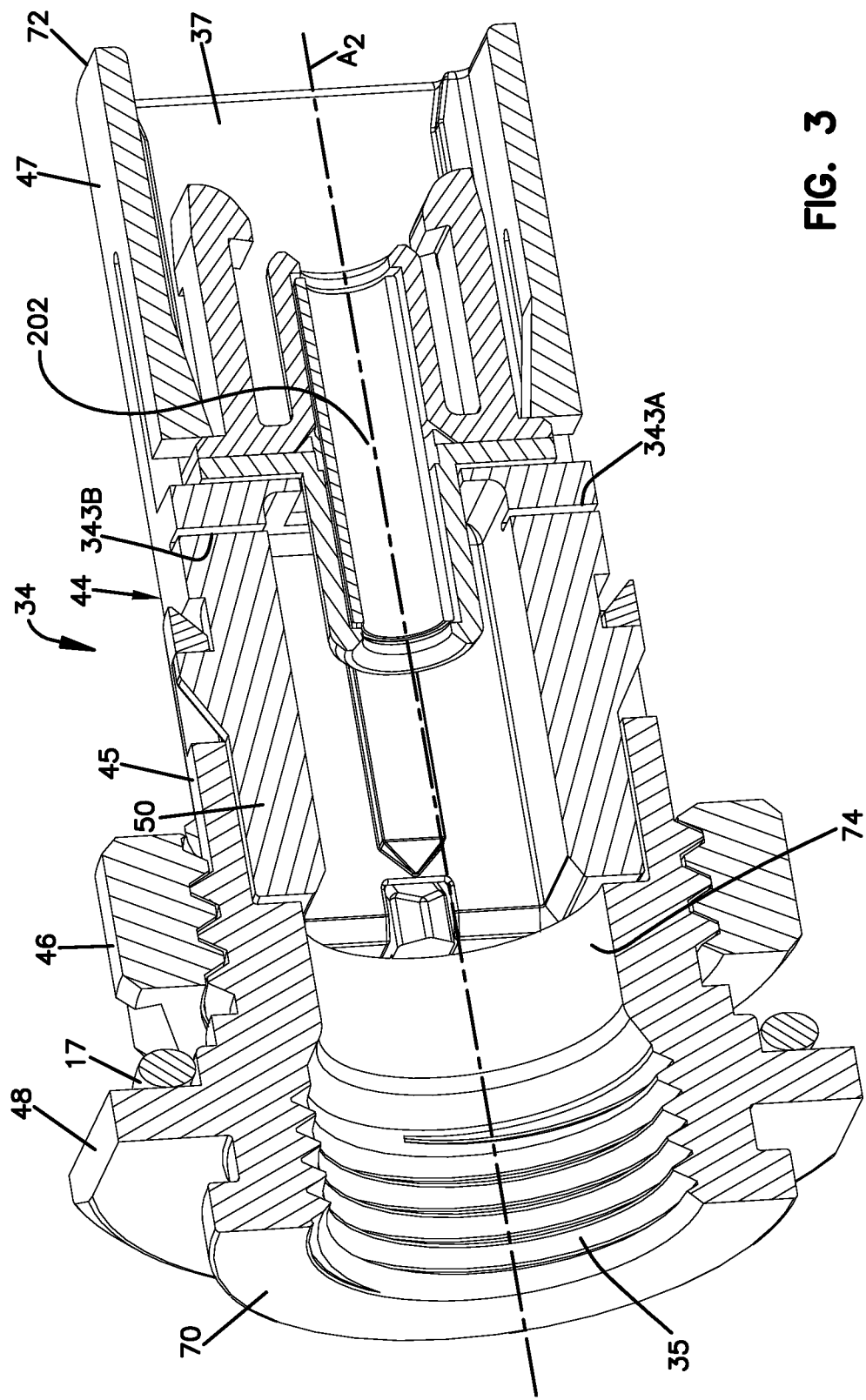
FIG. 3 is a cross-sectional perspective view of the optical/electrical adapter of FIG. 1 with the electrical conductors of the optical/electrical adapter removed.

As depicted, the fiber optic connector 32 can be received by and connected to a fiber optic adapter 34. The fiber optic adapter 34 can be a ruggedized fiber optic adapter and is depicted as such. The fiber optic adapter 34 includes similarities to fiber optic adapters illustrated at U.S. Patent Application Publications 2009/0148101, 2009/0148102, 2009/0148103, and 2009/0148104, incorporated by reference above. The fiber optic adapter 34 includes a housing 44 (see FIG. 3) that extends between a first end 70 and a second end 72. As depicted, the housing 44 includes a first housing piece 45 and a second housing piece 47 that snap together. The first end 70 of the housing 44 includes a port 35, and the second end 72 includes a port 37. As depicted, the port 35 is a ruggedized port and the port 37 is a non-ruggedized port. The ruggedized port 35 includes internal threads 76 and a sealing surface 74 (see FIG. 4) that are included in the first housing piece 45. An adapter mounting nut 46 can be placed over external threads 66 of the first housing piece 45 of the adapter housing 44. The first housing piece 45 can include a mounting flange 48 for use in conjunction with the adapter mounting nut 46. A sealing member 17 can be placed around the adapter housing 44 between the adapter mounting nut 46 and the mounting flange 48. Ruggedisation functions, including sealing by the sealing member 17 and the sealing surface 74, adapter 34 mounting by the mounting flange 48 and the mounting nut 46, and connector 32 attachment by the internal threads 76 are thus accomplished and/or accommodated by the first housing piece 45 of the adapter housing 44. A ferrule holding and alignment sleeve 202 is mounted within the fiber optic adapter 34 and is accessible from both the ports 35 and 37. The alignment sleeve 202 defines an axis $A_2$ of the fiber optic adapter 34.

The fiber optic adapter 34 includes a first electrical conductor 323A and a second electrical conductor 323B. The first and second electrical conductors 323A, 323B can be substantially identical to each other and be collectively referred to as an electrical conductor 323 (see FIGS. 7 and 8). In certain embodiments, the electrical conductor 323 is made of a material with flexible and/or spring-like properties. The first electrical conductor 323A is electrically connected with the first electrical conductor 391A and the second electrical conductor 323B is electrically connected with the second electrical conductor 391B when the fiber optic connector 32 is fully received by the fiber optic adapter 34 (see FIGS. 1 and 2). As depicted, the second housing piece 47 of the adapter housing 44 includes a first slot 343A and a second slot 343B that extend through a wall 50 of the second housing piece 47 (see FIG. 3). The first and the second slots 343A, 343B extend through the wall 50 of the second housing piece 47 of the housing 44 between the sealing member 17 and the non-ruggedized port 37 and thus do not interfere or compromise functionality of the sealing member 17, the sealing surface 74, and/or other ruggedized features of the ruggedized fiber optic adapter 34. The first and the second slots 343A, 343B extend within an interior of the adapter housing 44. As depicted, the first electrical conductor 323A is positioned partially within the first slot 343A, and the second electrical conductor 323B is positioned partially within the second slot 343B (see FIGS. 3 and 4).

Figure 4:
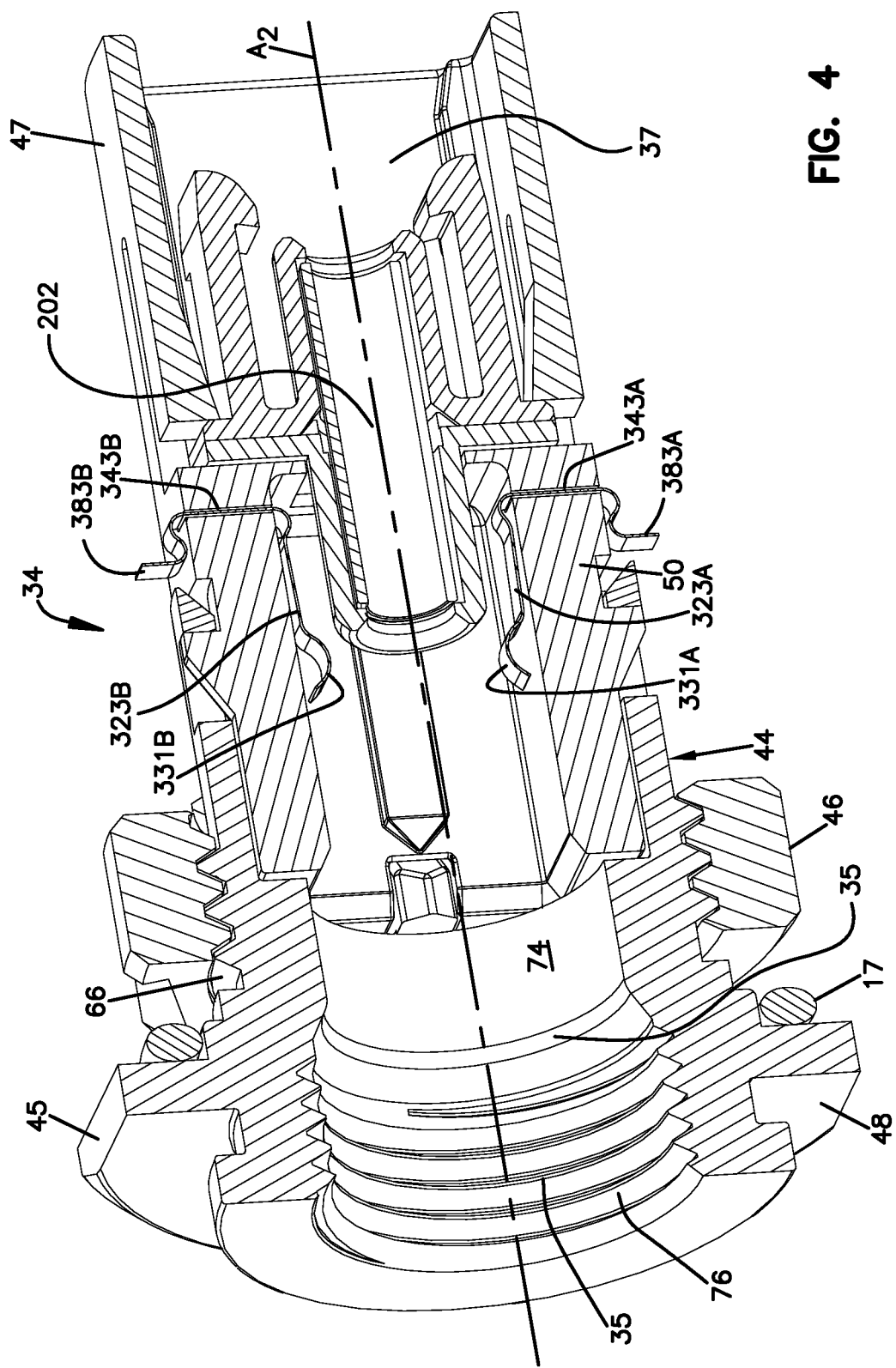
FIG. 4 is the cross-sectional perspective view of FIG. 3 but with the electrical conductors shown.

The first electrical conductor 323A of the fiber optic adapter 34 includes a contacting portion 383A at or near an exterior of the adapter housing 44, and the second electrical conductor 323B includes a contacting portion 383B at or near the exterior of the adapter housing 44 (see FIG. 4). As depicted, the contacting portions 383A, 383B face normal to the central longitudinal axis $A_2$ of the fiber optic adapter 34. The first electrical conductor 323A of the fiber optic adapter 34 includes a contact 331A at or near the interior of the adapter housing 44, and the second electrical conductor 323B includes a contact 331B at or near the interior of the adapter housing 44 (see FIG. 4). The contacts 331A, 331B are biased inwardly within the adapter housing 44 and are adapted to be mechanically and electrically connected with the contacting portions 381A, 381B of the electrical conductors 391A, 391B of the fiber optic connector 32 when the fiber optic connector 32 is fully inserted into the first port 35 of the fiber optic adapter 34. The contacts 331A, 331B include a ramp and/or a rounded portion 332 (see FIGS. 7 and 8). As depicted, the electrical conductor 323 includes a cantilevered arm 333 that urges the contacts 331A, 331B inward toward the axis $A_2$ of the fiber optic adapter 34 when the electrical conductors 323 are in an installed position, as shown at FIG. 4.

When the fiber optic connector 32 is inserted into the port 35 of the fiber optic adapter 34, the plug portion 56 can flex the contacts 331A, 331B of the electrical conductors 323A, 323B outward. As the insertion continues, the contacts 331A, 331B reach the detents 55A, 55B of the connector housing 39 and thereby un-flex into the detents 55A, 55B. When the contacts 331A, 331B un-flex, they establish electrical contact with the contacting portions 381A, 381B of the electrical conductors 391A, 391B of the fiber optic connector 32. The electrical conductors 323A, 323B thereby electrically connect the fiber optic connector 32 to the exterior of the fiber optic adapter 34.

Figure 12:
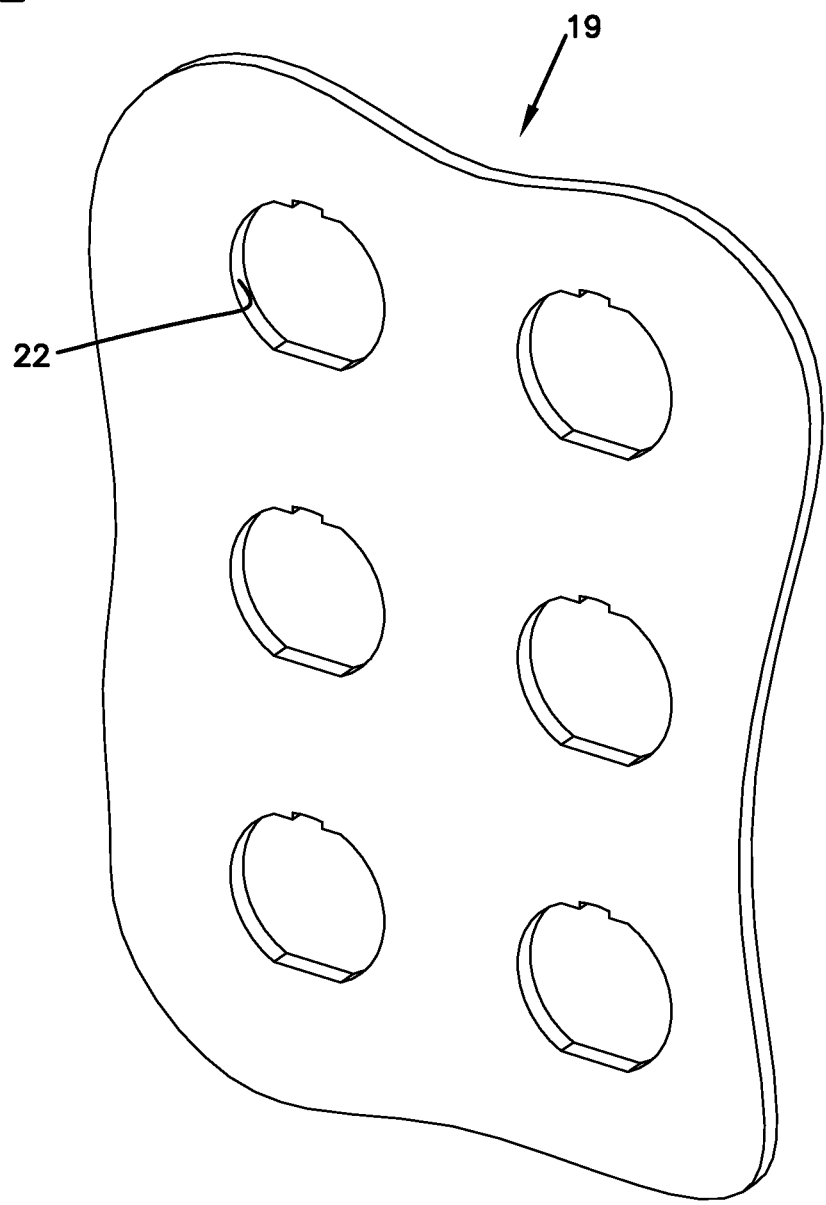
FIG. 12 is the partial perspective view of FIG. 11 but with only the cabinet panel shown.
Figure 13:
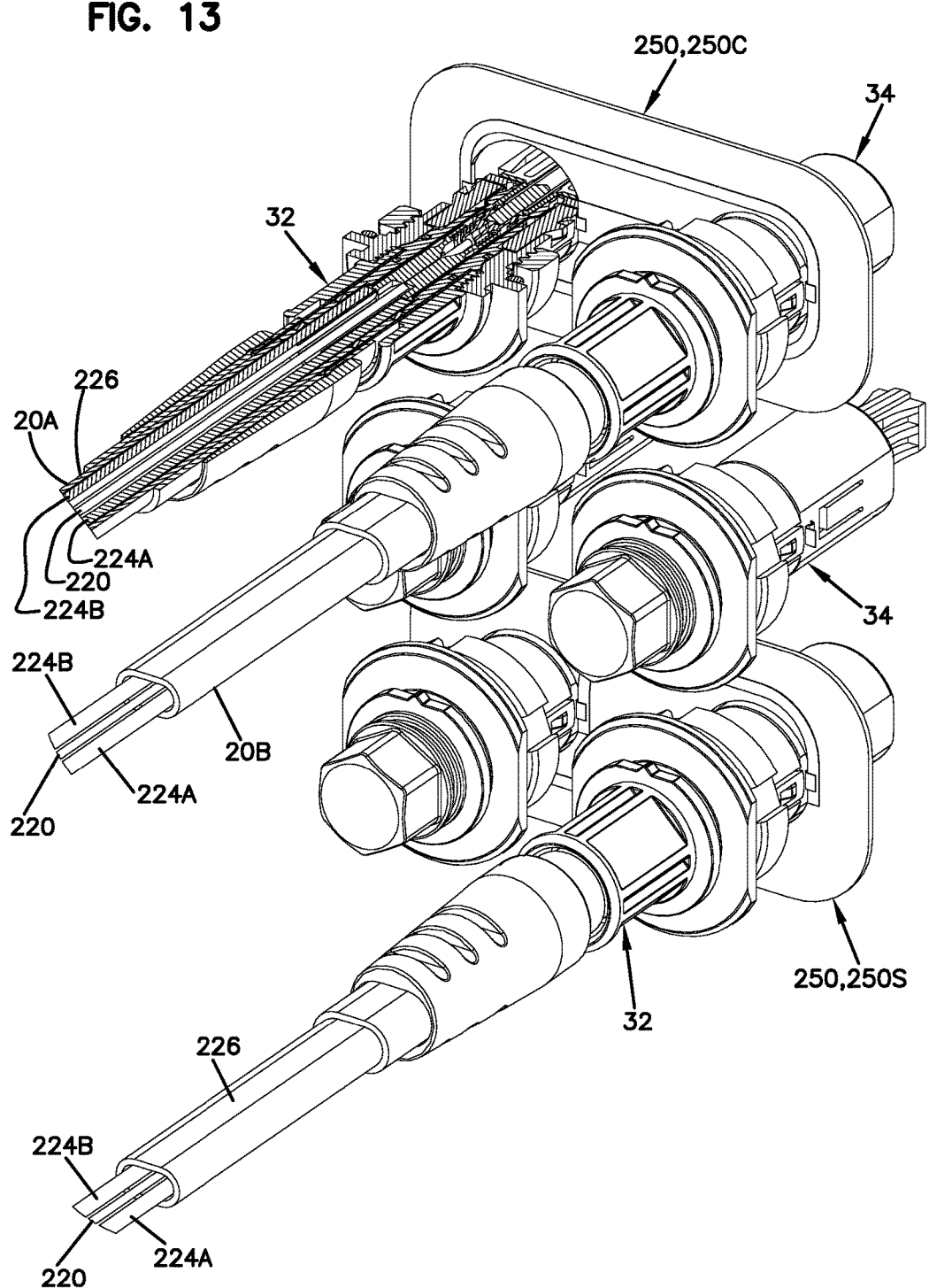
FIG. 13 is the partial perspective view of FIG. 11 but with the cabinet panel removed thereby more fully revealing adapter-to-adapter electrical conductors within the cabinet.
Figure 14:
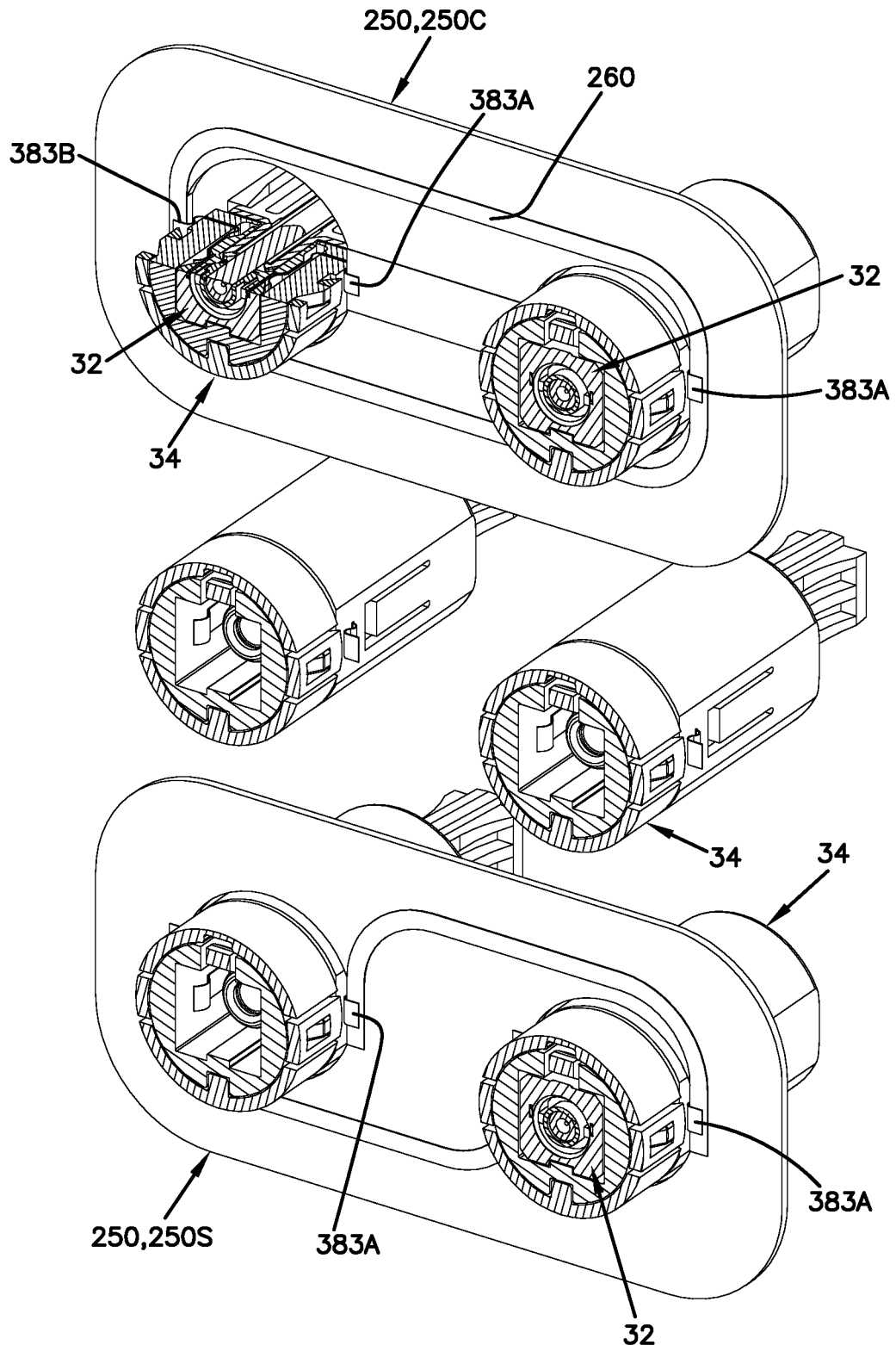
FIG. 14 is the partial perspective view of FIG. 11 but with the cabinet panel removed and portions of the adapters and the connectors cut away thereby more fully revealing the adapter-to-adapter electrical conductors of FIG. 13.
Figure 15:
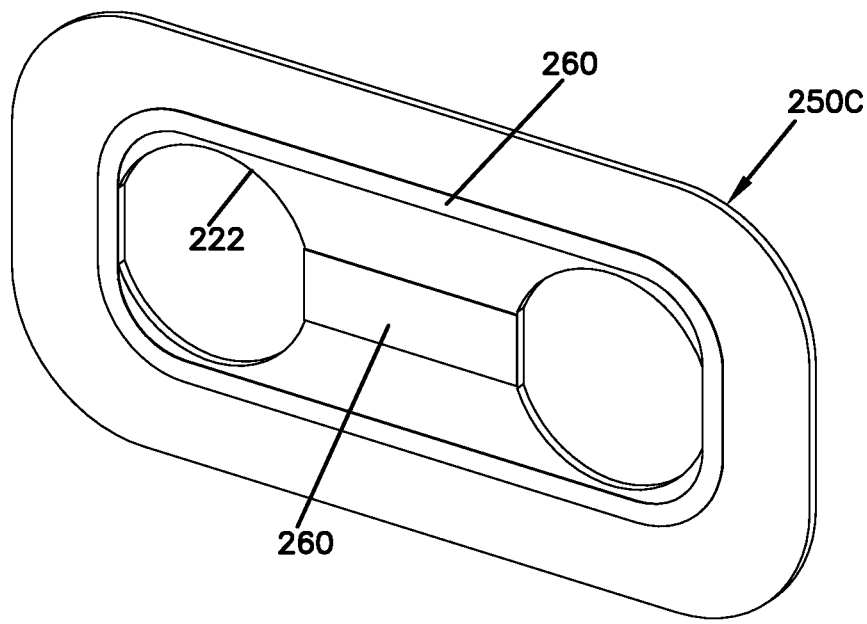
FIG. 15 is the partial perspective view of FIG. 11 but with only one of the adapter-to-adapter electrical conductors of FIG. 13 shown.
Figure 16:
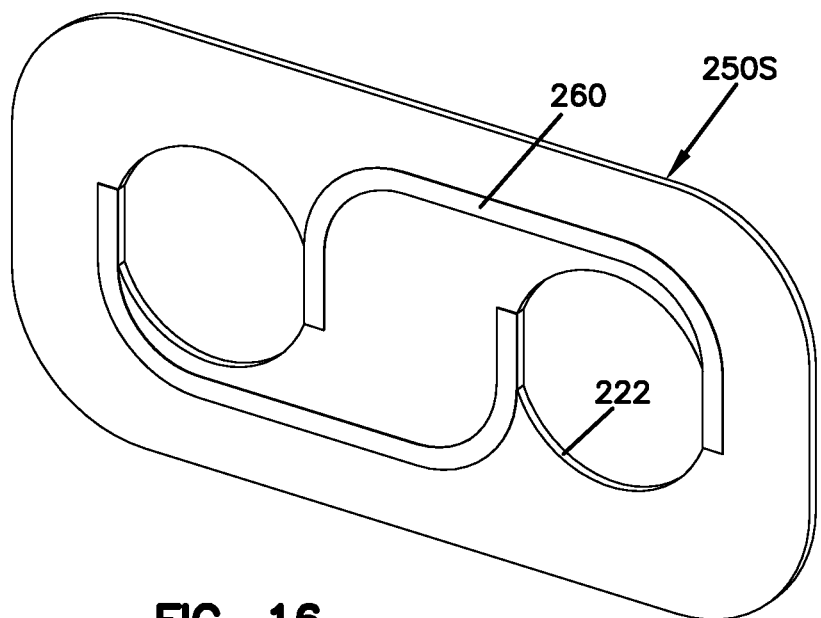
FIG. 16 is the partial perspective view of FIG. 11 but with only another of the adapter-to-adapter electrical conductors of FIG. 13 shown.
Figure 17:
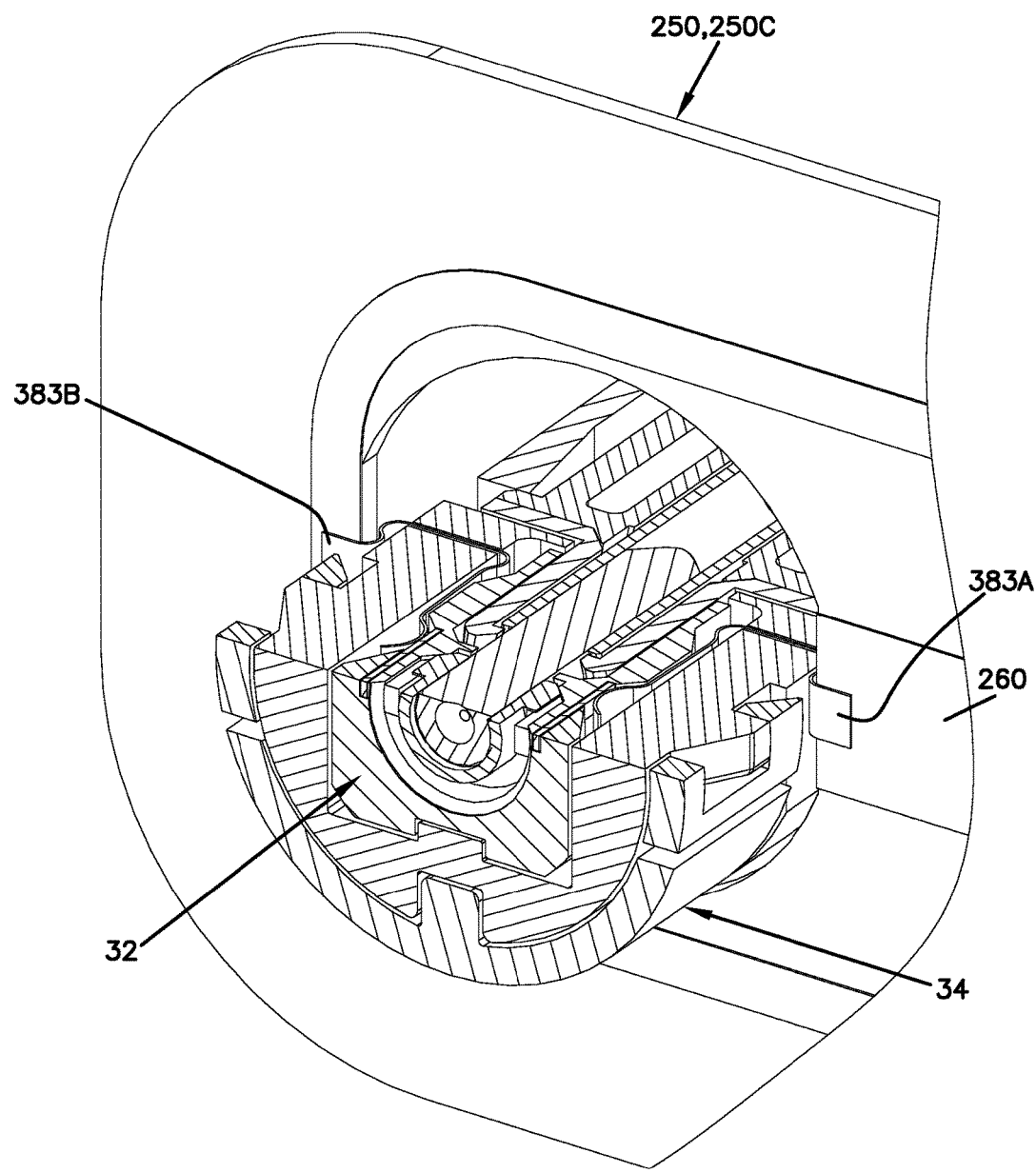
FIG. 17 is an enlarged portion of an upper-left corner of FIG. 14.
Figure 18:
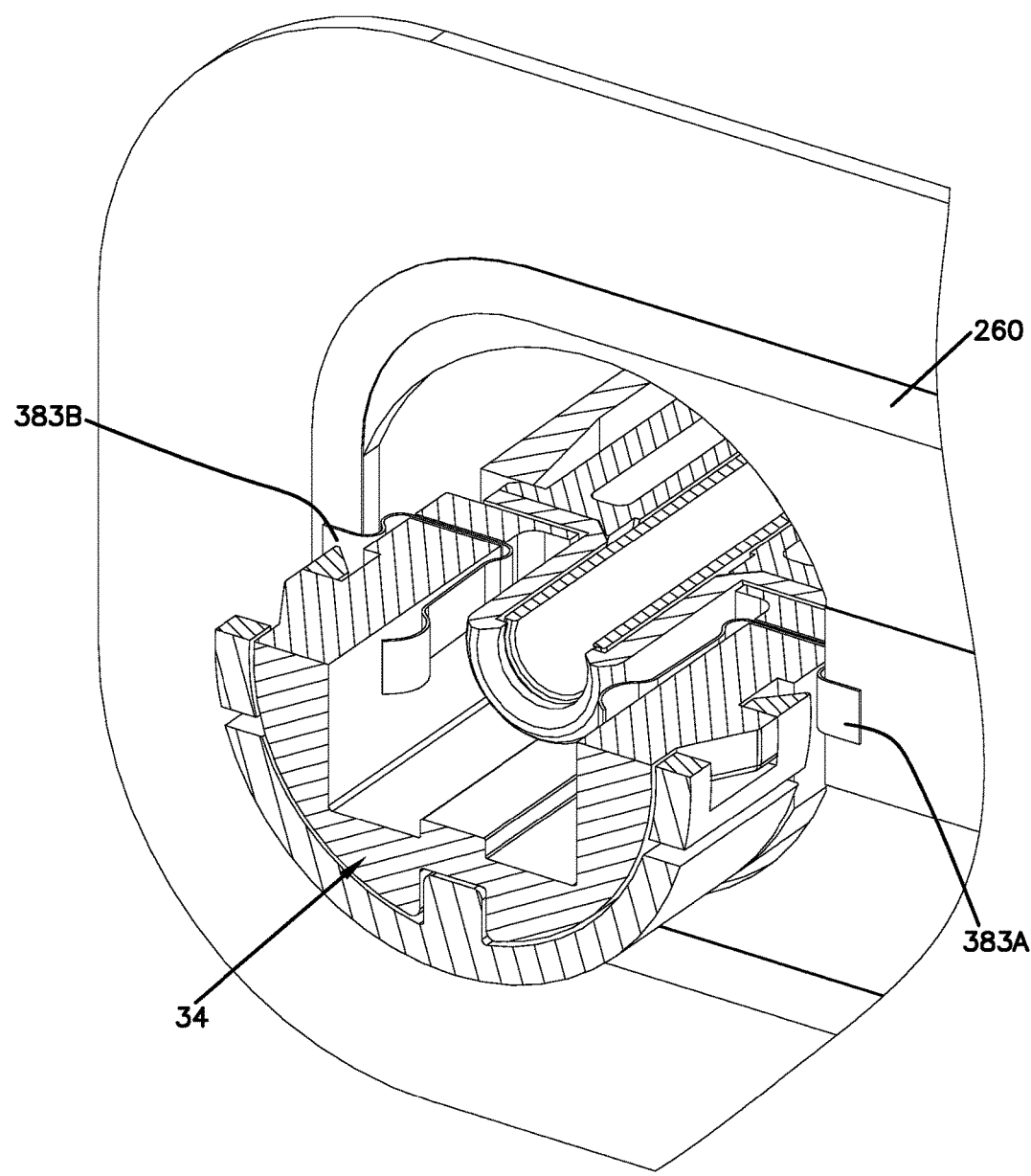
FIG. 18 is the enlarged portion of FIG. 17 but with the optical/electrical connector of FIG. 1 removed.

A path of electrical continuity that respectively includes the strength members 224A, 224B of the fiber optic cable 20, the conductors 391A, 391B of the fiber optic connector 32, and the conductors 323A, 323B of the fiber optic adapter 34 can continue within a enclosure 19 (e.g., a cabinet, a fiber distribution hub, a drop terminal, etc.) or other piece of optical-electrical hardware (see FIGS. 11, 13, 14, and 17-19). An example drop terminal is described at U.S. Patent Application Publication No. 2008/0138025, published Jun. 12, 2008, and is hereby incorporated by reference in its entirety. The enclosure 19 includes one or more openings 22 (see FIG. 12) that are adapted to mount the fiber optic adapter 34. An example electrical conductor 260 can be included within the enclosure 19 that makes electrical contact with the contacting portions 383A, 383B of the electrical conductors 323A, 323B (see FIG. 14). The path of electrical continuity can transmit electricity for the purpose of electrical power and/or electrical signals between the fiber optic cable 20 and the enclosure 19.

The electrical conductor 260 can be included on and held by a circuit board 250 or other suitable means. FIGS. 11 and 13-19 illustrate several circuit boards that are collectively referred to as the circuit boards 250. The circuit boards 250 include several electrical conductors that are collectively referred to as the electrical conductors 260.

The electrical conductors 323 include a valley 328 and a peak 329. The circuit boards 250 can be held in operational position by mounting them on one or more of the electrical conductors 323. In particular, the circuit boards 250 include one or more openings 222 (see FIGS. 15 and 16). The openings 222 of the circuit boards 250 can be held within a pair of opposed valleys 328 of the electrical conductors 323 of the fiber optic adapters 34. The circuit boards 250 can be snapped on and snapped off from around the fiber optic adapters 34 by pressing them over the peaks 329 of the electrical conductors 323 of the fiber optic adapters 34. The peaks 329 can elastically and/or plastically deform when the circuit board 250 is snapped on and off.

The circuit boards 250 or other mountings for the electrical conductors 260 within the enclosure 19 can be mechanically supported by the enclosure 19 and/or other structure within the enclosure 19. This allows the electrical conductors 323 of the adapter 34 to be electrically connected with the conductors 260 of the circuit board 250 when the adapter 34 is inserted through the opening 22 of the enclosure 19. As described above but with the circuit board 250 remaining stationary, the adapter 34 can be snapped in and snapped out of the opening 222 of the circuit board 250.

FIGS. 11 and 13-19 illustrate the various circuit boards 250. In particular, FIGS. 11 and 13-18 illustrate a crossed connection circuit board 250C and a straight connection circuit board 250S. The circuit boards 250C and 250S can transmit signals and/or power between a first fiber optic cable 20A and a second fiber optic cable 20B. The crossed connection circuit board 250C results in electrical connection between the first strength member 224A of the first fiber optic cable 20A and the second strength member 224B of the second fiber optic cable 20B. The crossed connection circuit board 250C also results in electrical connection between the second strength member 224B of the first fiber optic cable 20A and the first strength member 224A of the second fiber optic cable 20B (see FIG. 13). The straight connection circuit board 250S results in electrical connection between the first strength member 224A of the first fiber optic cable 20A and the first strength member 224A of the second fiber optic cable 20B. The straight connection circuit board 250S also results in electrical connection between the second strength member 224B of the first fiber optic cable 20A and the second strength member 224B of the second fiber optic cable 20B.

The circuit boards 250C and 250S and the paths of electrical continuity that they are part of can be used, for example, to bring electrical power from a dwelling of an end user to a fiber optic enclosure (e.g., the cabinet, the fiber distribution hub, the drop terminal, etc.). The electrical power can be transferred by the fiber optic cables 20A, 20B and used within the fiber optic enclosure to provide power to active optical components within the enclosure. One of the cables 20A, 20B can be connected to the dwelling of the end user and receive electrical power from the dwelling.

Figure 19:
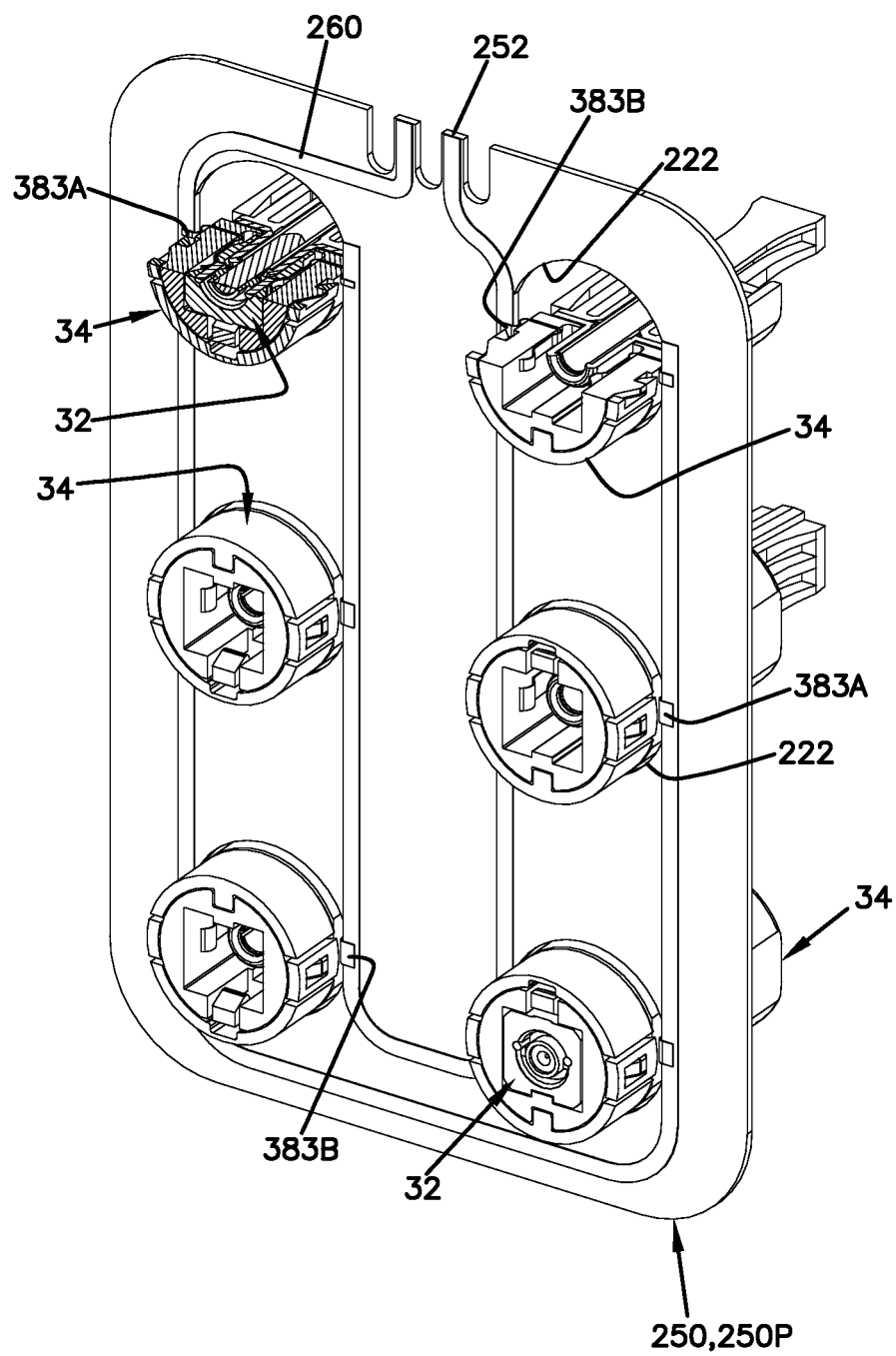
FIG. 19 is similar to the view of FIG. 14 but with a multi-adapter electrical conductor replacing the adapter-to-adapter electrical conductors of FIG. 13, only two of the optical/electrical connectors of FIG. 1 inserted into the six optical/electrical adapters of FIG. 1, three left-side adapters having an inverted orientation, and one of the adapters shown in horizontal cross-section.

FIG. 19 illustrates a circuit board 250P that includes an electrical plug 252. The circuit board 250P and the paths of electrical continuity that it is a part of can be used, for example, to bring electrical power from a power supply within a fiber optic enclosure to one or more of the fiber optic cables 20 that are connected to the fiber optic enclosure. Similarly, the circuit board 250P and the paths of electrical continuity can be used to transmit an electrical signal to, from, and/or through the fiber optic enclosure that mounts the circuit board 250P.

From the forgoing detailed description, it will be evident that modifications and variations can be made in the devices of the disclosure without departing from the spirit or scope of the invention.

What is claimed is:

1. A ruggedized fiber optic and electrical connector configured to terminate a fiber optic and electrical cable, the ruggedized fiber optic and electrical connector comprising:
   a connector housing including at least one electrical contact pathway that longitudinally extends at least partially within the connector housing;
   a ferrule mounted to the connector housing and configured to terminate at least one optical fiber of the fiber optic and electrical cable;
   at least one electrical contact received at least partially in the at least one electrical contact pathway of the connector housing and configured to terminate at least one electrical conductor of the fiber optic and electrical cable; and
   a rotatable coupler rotatably mounted around the connector housing and configured to mechanically connect the ruggedized fiber optic and electrical connector to a mating device.

2. The ruggedized fiber optic and electrical connector of claim 1, wherein the mating device is a fiber optic and electrical adapter.

3. The ruggedized fiber optic and electrical connector of claim 2, further comprising:
   a plug portion arranged at a distal end of the connector housing and configured for insertion into a port of the fiber optic and electrical adapter.

4. The ruggedized fiber optic and electrical connector of claim 1, wherein the mating device is a second fiber optic and electrical connector.

5. The ruggedized fiber optic and electrical connector of claim 1, wherein each of the at least one electrical contact has a contacting portion exposed from the connector housing and arranged adjacent the ferrule.

6. The ruggedized fiber optic and electrical connector of claim 2, wherein each of the at least one electrical contact has a contacting portion exposed from the connector housing at the plug portion.

7. The ruggedized fiber optic and electrical connector of claim 1, wherein the rotatable coupler includes a coupling nut.

8. The ruggedized fiber optic and electrical connector of claim 1, further comprising:
   a sealing member mounted around the connector housing.

9. The ruggedized fiber optic and electrical connector of claim 8, wherein the connector housing includes a monolithic structure that defines a ferrule mount that mounts the ferrule and a sealing surface that seals against the sealing member.

10. The ruggedized fiber optic and electrical connector of claim 1, wherein the connector housing includes at least one channel that receives the at least one electrical conductor of the fiber optic and electrical cable.

11. The ruggedized fiber optic and electrical connector of claim 10, wherein that at least one electrical contact pathway is connected to the at least one channel of the connector housing to electrically connect the at least one electrical contact with the at least one electrical conductor of the fiber optic and electrical cable.

12. The ruggedized fiber optic and electrical connector of claim 11, wherein the at least one electrical contact includes a lug adapted to be mechanically and electrically connected with the at least one electrical conductor of the fiber optic and electrical cable.

13. The ruggedized fiber optic and electrical connector of claim 12, wherein the lug is bonded to the strength member by an electrically conducting material.

14. The ruggedized fiber optic and electrical connector of claim 1, wherein the at least one electrical conductor of the fiber optic and electrical cable includes at least one strength member of the fiber optic and electrical cable.

15. The ruggedized fiber optic and electrical connector of claim 1, wherein the connector housing includes at least one detent that exposes the at least one electrical contact pathway.

16. The ruggedized fiber optic and electrical connector of claim 1, wherein the at least one electrical contact pathway extends substantially parallel to a central longitudinal axis of the connector housing.

17. The ruggedized fiber optic and electrical connector of claim 1, wherein the at least one electrical contact pathway includes a pair of electrical contact pathways.

18. A fiber optic and electrical connection system comprising:
   a fiber optic and electrical cable including at least one electrical conductor, an optical fiber, and a cable jacket positioned around the at least one electrical conductor and the optical fiber;
   the ruggedized fiber optic and electrical connector according to any of claims 1-17; and
   a fiber optic and electrical adapter configured to mechanically engage with the ruggedized fiber optic and electrical connector, the fiber optic and electrical adapter including:
      an adapter housing with a first end defining a first port and an opposite second end defining a second port; and
      at least one adapter electrical contact in the first port that electrically connects to the at least one electrical contact of the ruggedized fiber optic and electrical connector when the fiber optic and electrical adapter engages with the ruggedized fiber optic and electrical connector.

19. The fiber optic and electrical connection system of claim 18, wherein the fiber optic and electrical adapter further includes a ferrule sleeve within the adapter housing that receives the ferrule.

20. The fiber optic and electrical connection system of claim 18, wherein the first port of the fiber optic and electrical adapter is configured to receive the plug portion of the ruggedized fiber optic and electrical connector.

* * * * *